April 25, 1944.  C. H. H. RODANET  2,347,613
MAGNETIC TACHOMETER
Filed Jan. 3, 1941  2 Sheets-Sheet 1
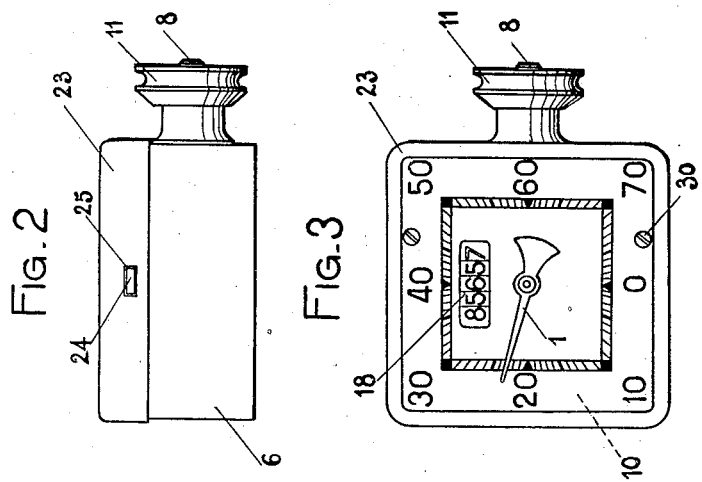
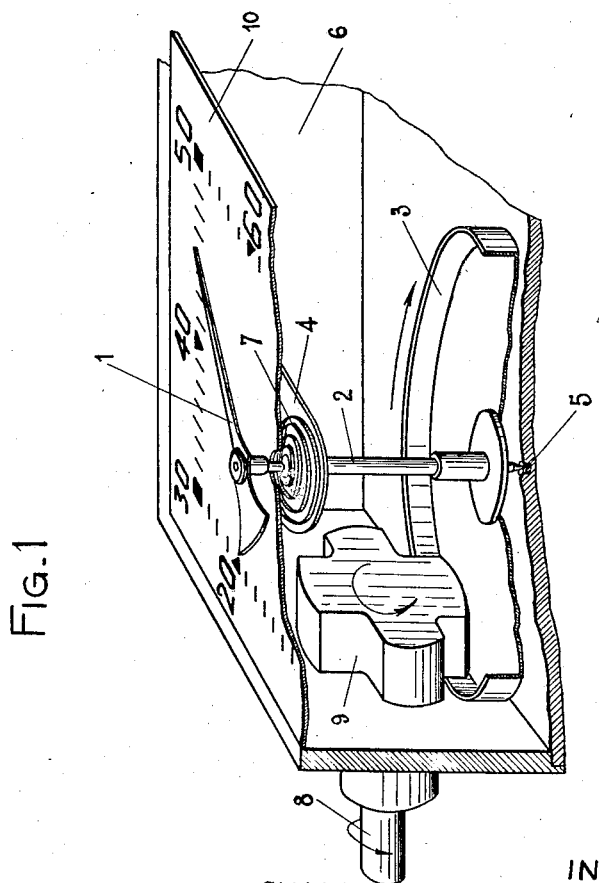
INVENTOR:
CHARLES HILAIRE HENRI RODANET
BY Haseltine, Lake & Co.
ATTORNEYS

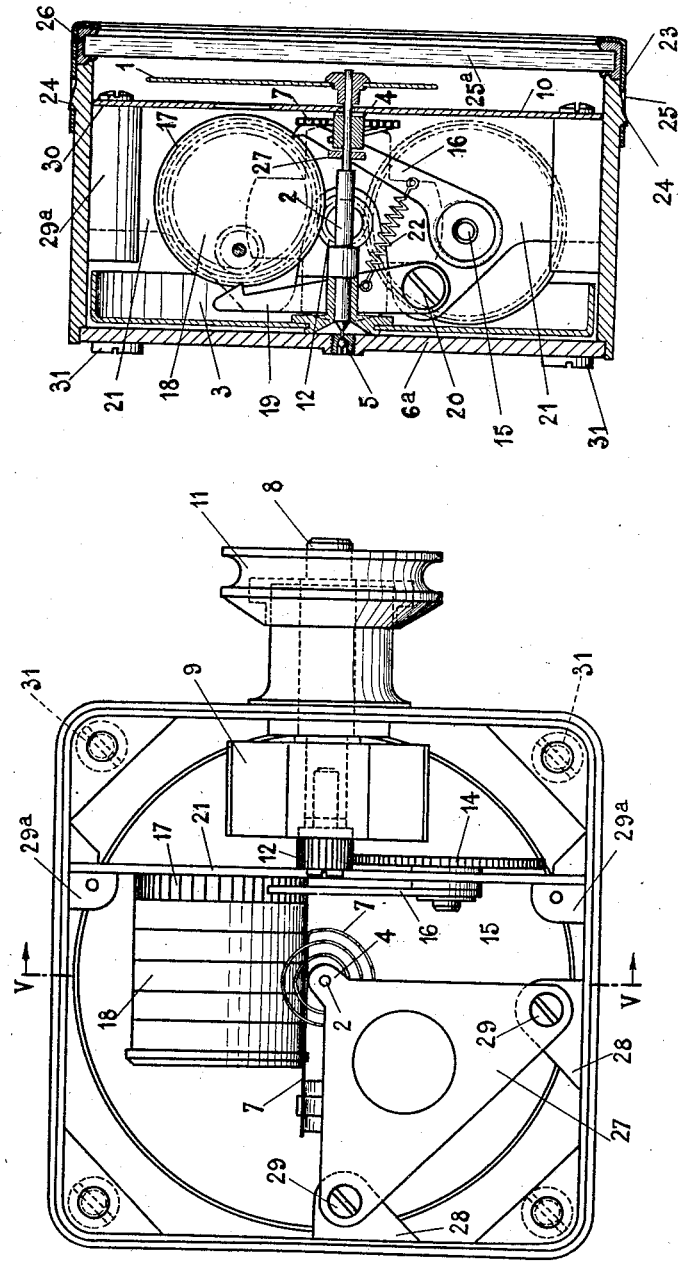

Patented Apr. 25, 1944

2,347,613

UNITED STATES PATENT OFFICE 2,347,613

MAGNETIC TACHOMETER

Charles Hilaire Henri Rodanet, Neuilly-sur-Seine, France; vested in the Alien Property Custodian Application January 3, 1941, Serial No. 372,968
In France October 29, 1940

2 Claims. (Cl. 264—13)

The invention relates to magnetic tachometers; it is adapted to improve them, to simplify their construction and to render the utilisation thereof more convenient for certain applications.

Magnetic tachometers are composed of an index driven by a pivoting metallic bell, restored by a spring towards a fixed position of rest, and movable in the air-gap of a magnetic circuit comprising a fixed framework and a rotating magnet. Up to now, the axes of rotation of the bell and of the magnet always geometrically coincide; according to the invention, they are, on the contrary, perpendicular to each other. This arrangement simplifies the construction and appreciably reduces the cost price; furthermore, it renders the assemblage of the tachometer very easy when the latter is used as speedometer on bicycles and motor bicycles. It is moreover mainly in view of this application that the apparatus has been devised; and in this case it is advantageous that the index, in its position of rest, should be at right angles to the plane formed by the axes of rotation of the bell and of the magnet. In fact, the axis of rotation of the magnet is laterally extended to receive a pulley, placed parallel to the bicycle wheel which transmits its movement thereto by means of a belt; the index, arranged as just stated, is therefore placed in a good reading position.

The apparatus improved according to the invention can, of course, be combined with one or more mileage totalisers. In this case, the perpendicular arrangement of the axes of rotation of the bell and of the magnet allows of obtaining another advantage, since the axis of the totaliser drums, necessarily parallel to the dial or reading plane, is then parallel to the axis of rotation of the magnet, instead of being at right angles thereto as is known apparatus.

A right angle transmission is therefore unnecessary and a much more simple and more economical arrangement results therefrom.

In the accompanying drawings, illustrated by way of example only:

Fig. 1 is a partial perspective view with parts broken away and more particularly showing the characteristic arrangement according to the invention.

Fig. 2 is a general elevation of a tachometer.

Fig. 3 is a plan view corresponding to the preceding figure.

Fig. 4 is a view corresponding to Fig. 3, but on a larger scale, the cover of the case and the dial being removed to show the entire mechanism.

Fig. 5 is a section made according to line V—V of Fig. 4.

The magnetic tachometer, illustrated in Fig. 1, comprises an index 1 rendered angularly rigid with a spindle 2, rigid with a driving rotating bell 3. The spindle 2 is journalled, near its upper part, in a bearing 4 and, at its lower end, in a bearing 5 forming thrust-bearing. The bearing 4 is rigidly connected to the case 6 of the tachometer and the thrust-bearing 5 is mounted in the bottom of said case.

The pivoting units constituted by the index 1, the spindle 2 and the bell 3, is restored by a spiral spring 7 towards a fixed position of rest which is the zero position marked on a dial 10 bearing the indications of the instantaneous speed and over which the index 1 moves.

In contradistinction to the arrangements previously adapted in known magnetic tachometers, the spindle 8 of the rotating magnet 9 is perpendicular to the spindle 2 of the bell 3. This construction according to the invention has many advantages particularly when such a tachometer is used as speedometer on an ordinary bicycle, or on a motor bicycle. In fact, the spindle 8 on which the magnet is mounted is laterally extended outside the case 6 to receive a pulley 11 (Fig. 2 and following), placed parallel to the bicycle wheel which transmits its movement thereto by means of a belt, the index 1 being, moreover, correctly placed in good reading poposition. Furthermore, this perpendicular arrangement of both axes allows of simplifying the construction and the assemblage, and of reducing the cost price, which is particularly advantageous for small tachometers adapted to be used on light vehicles as previously indicated.

As more particularly shown in Figs. 2 and 3, and in greater detail in Figs. 4 and 5, the improved apparatus according to the invention is combined with a mileage totaliser. On the spindle 8 of the pulley 11 is rigidly secured a pinion 12 meshing with another pinion 14 on which is journalled, about a spindle 15, slightly out of center relatively to the axis of rotation of pinion 14, a feeding or driving pawl 16. Said pawl 16 acts on a rachet wheel 17 constituting the rotating input member of the mileage totaliser 18. A stop pawl 19 is pivoted at 20 on a plate 21 also supporting the spindle of pinion 14. A spring 22 connected at its ends, on the one hand, to the pawl 19 and, on the other hand, to the driving pawl 16, constantly urges both pawls 16 and 19 against the ratchet wheel 17.

It will be noted that the axis of the drums of the totaliser 18, necessarily parallel to the dial or reading plane 10, is arranged parallel to the axis of rotation 8 of the magnet, instead of being at right angles thereto as in known apparatus. It is therefore unnecessary to provide a right angle transmission which constitutes another simplification in the construction and a reduction of the cost price of the apparatus.

The lid or cover 23 of the case is resiliently held and locked in position by projections 24 provided on said case and which engage in corresponding ports 25 formed in the lateral wall of the cover 23. Said cover holds the protecting glass plate 25ª in position of assemblage by clamping a plastic or resiliently distortable ring 26 peripherally surrounding said glass plate. Said ring 26 moreover allows of obtaining a fluid-tight closure.

As more particularly shown in Figs. 4 and 5, the bearing 4 for the spindle 2 is provided in a small plate 27 secured by screws 29 on inner lugs or ears 28 of the case. The dial 10 is also secured on projections 29ª of the case by screws 30, and the bottom 6ª of the case is held in position by screws 31. On said bottom 6ª is secured, in particular by screwing, the bearing or thrust-bearing 5 for the lower end of the spindle 2.

A tachometer, devised as indicated, might be completed by a partial totaliser.

It is obvious that the embodiment previously described and illustrated is given herein only by way of indication and not in a limiting sense. All modifications or changes which do not alter in any way the main features above set forth or the desired result remain included in the scope of the present invention.

What I claim as my invention and desire to secure by Letters Patent is:

1. In a tachometer adapted to fit into a compact rectangular casing which is shallow from front to back, a movable unit comprising a pivoting shaft extending perpendicularly from the back toward the front and supporting an index and a metal disc parallel to said back and provided with a flange disposed substantially at right angles to said disc, a spring for restoring the movable unit towards a fixed position of rest, a rotating shaft so arranged that its geometrical axis is at right angles to the geometrical axis of the pivoting shaft and parallel with said front and back, a permanent multipolar magnet carried by said rotating shaft with the poles thereof projecting radially outward from said shaft, a fixed framework made of magnetic metal for completing the magnetic circuit of the permanent magnet and providing together with said magnet an air-gap through which passes the flange of the metal disc.

2. In a tachometer adapted to fit into a compact rectangular casing which is shallow from front to back, a movable unit comprising a pivoting shaft extending perpendicularly from the back toward the front and supporting an index and a metal disc parallel to said back and provided with a flange disposed substantially at right angles to said disc, a spring for restoring the movable unit towards a fixed position of rest, a rotating shaft so arranged that its geometrical axis is at right angles to the geometrical axis of the pivoting shaft and parallel with said front and back, and also to the fixed position of rest of the index, a permanent multipolar magnet carried by said rotating shaft with the poles thereof projecting radially outward from said shaft, a fixed framework made of magnetic metal for completing the magnetic circuit of the permanent magnet and providing together with the latter an air-gap through which passes the flange of the metal disc.

CHARLES HILAIRE HENRI RODANET.